Oct. 29, 1957  F. G. EUBANKS  2,811,063
WIRE CUTTER AND INSULATION STRIPPING APPARATUS
Filed Sept. 8, 1953  11 Sheets-Sheet 1
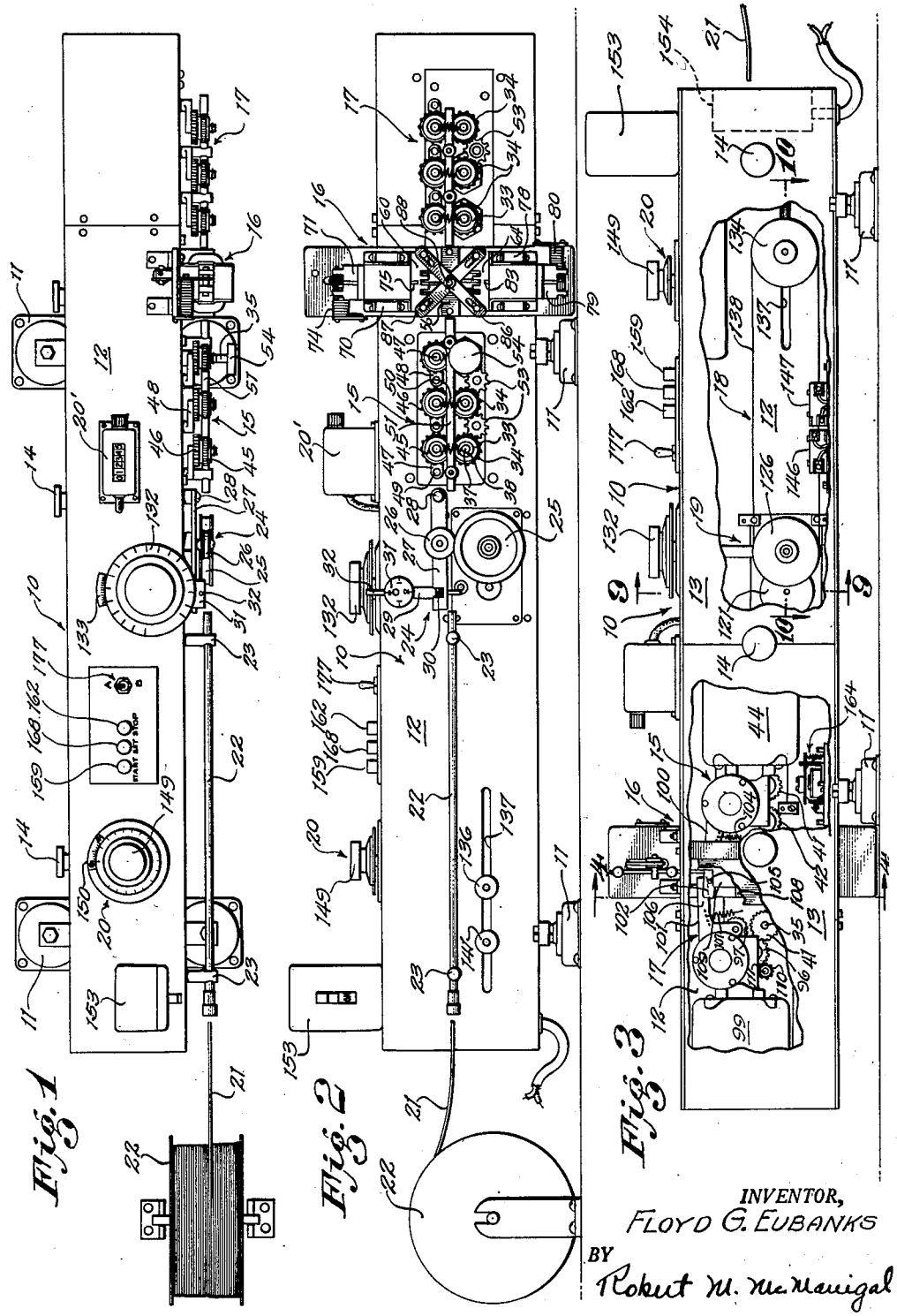
INVENTOR,
FLOYD G. EUBANKS
BY Robert M. McManigal
ATTORNEY.

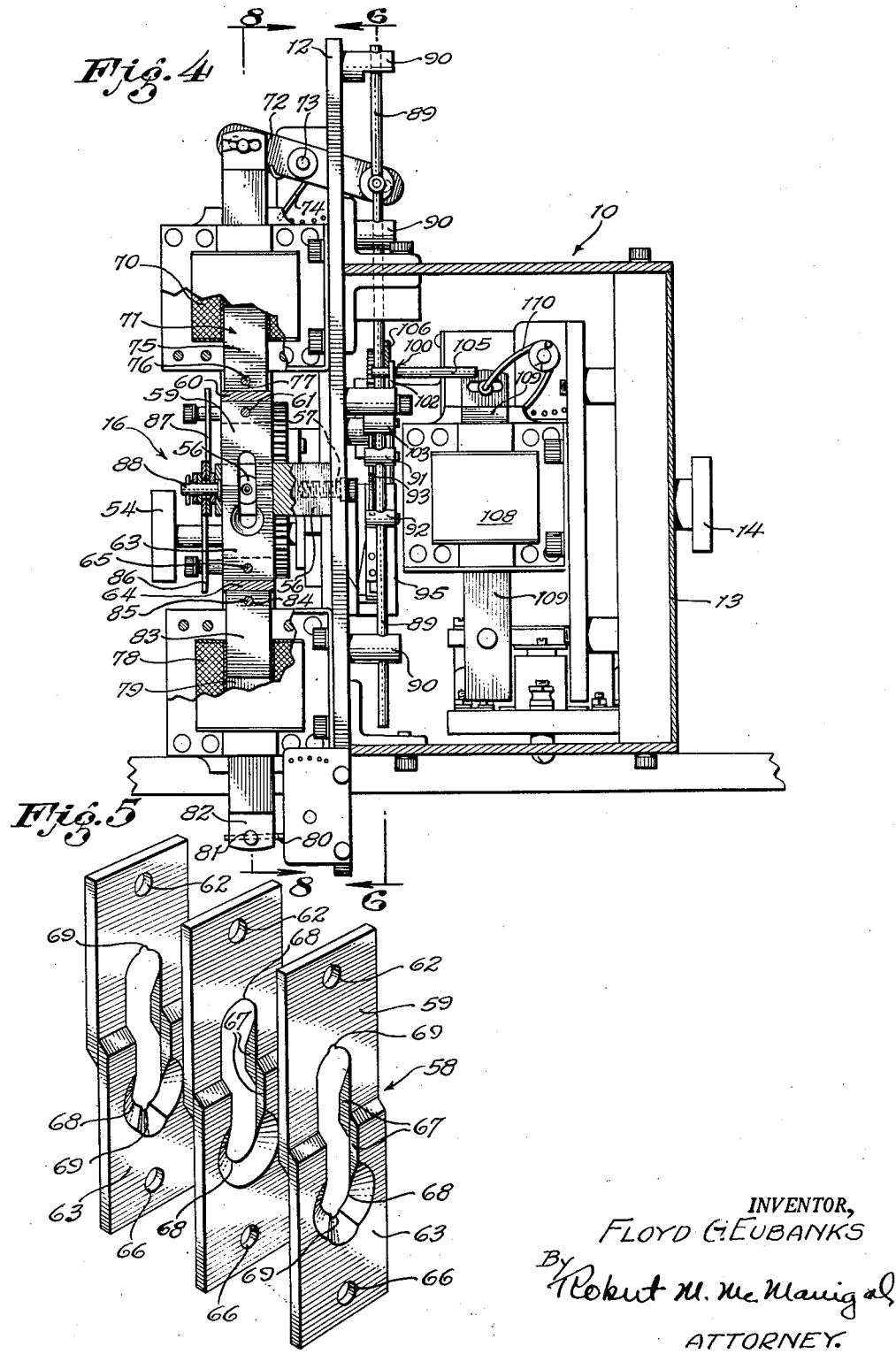

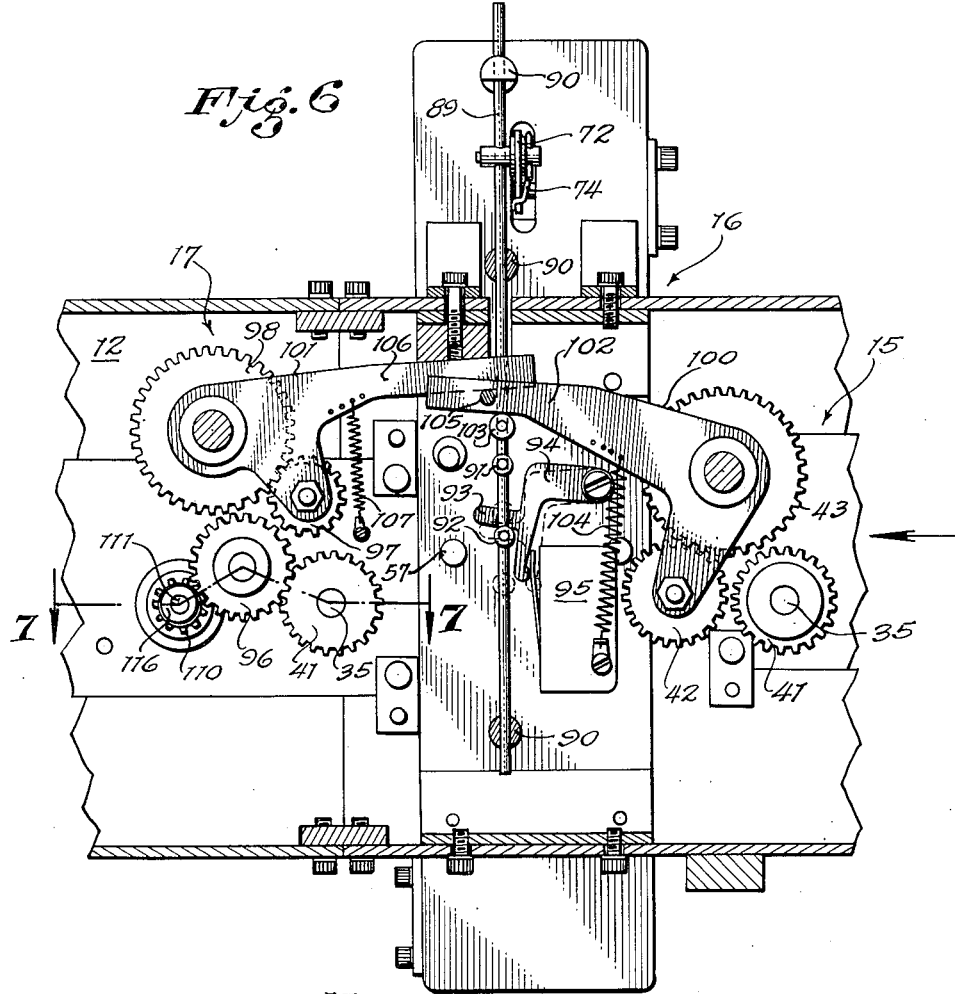
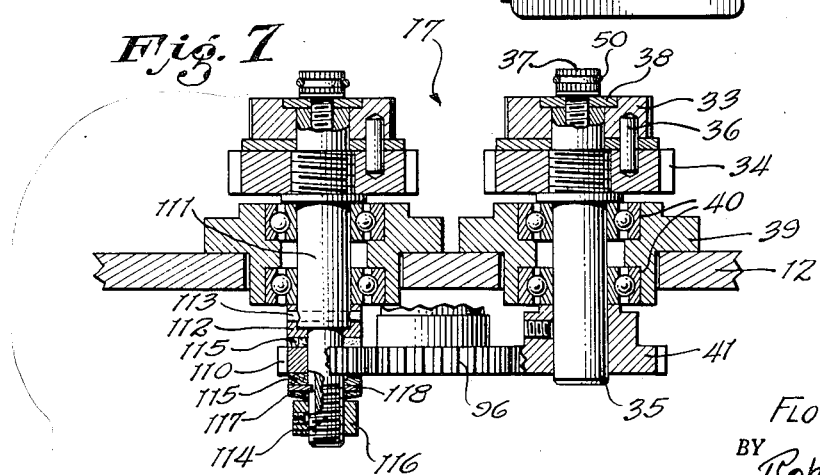

Oct. 29, 1957 F. G. EUBANKS 2,811,063
WIRE CUTTER AND INSULATION STRIPPING APPARATUS
Filed Sept. 8, 1953 11 Sheets-Sheet 4

INVENTOR,
FLOYD G. EUBANKS
BY
Robert M. McManigal
ATTORNEY.

Oct. 29, 1957 F. G. EUBANKS 2,811,063
WIRE CUTTER AND INSULATION STRIPPING APPARATUS
Filed Sept. 8, 1953 11 Sheets-Sheet 5

INVENTOR,
FLOYD G. EUBANKS
BY
Robert M. McManigal
ATTORNEY.

Oct. 29, 1957  F. G. EUBANKS  2,811,063
WIRE CUTTER AND INSULATION STRIPPING APPARATUS
Filed Sept. 8, 1953  11 Sheets-Sheet 6
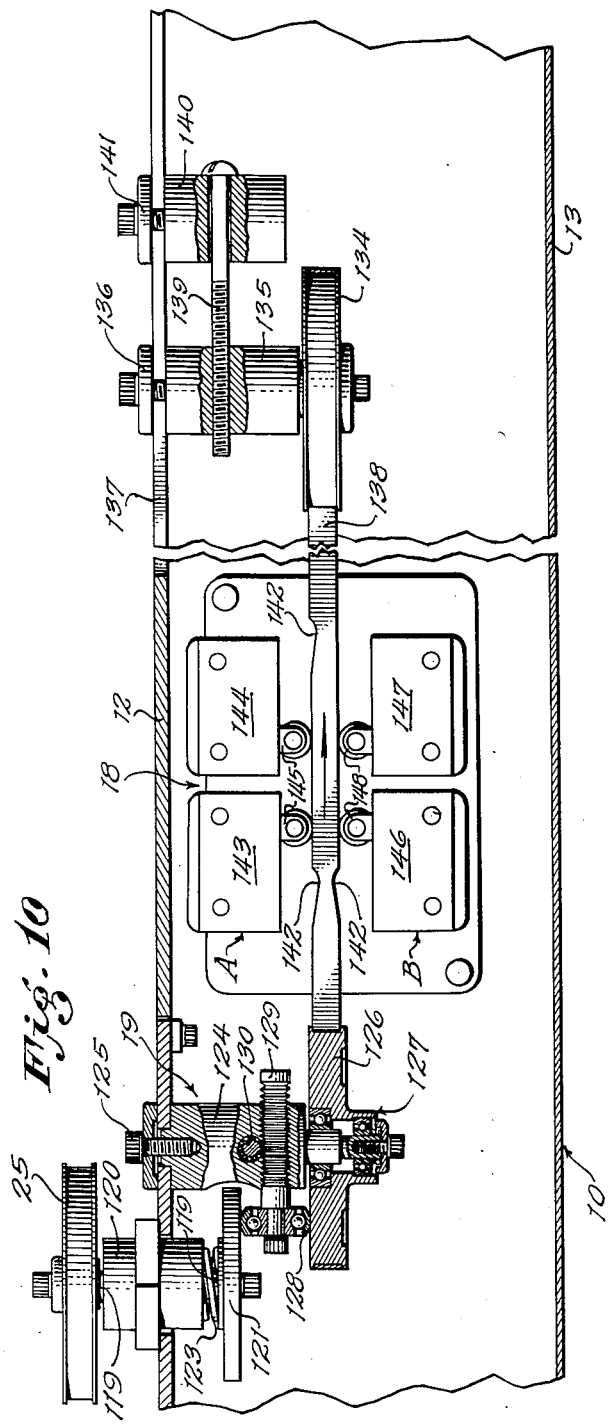
INVENTOR,
FLOYD G. EUBANKS
BY Robert M. McManigal
ATTORNEY.

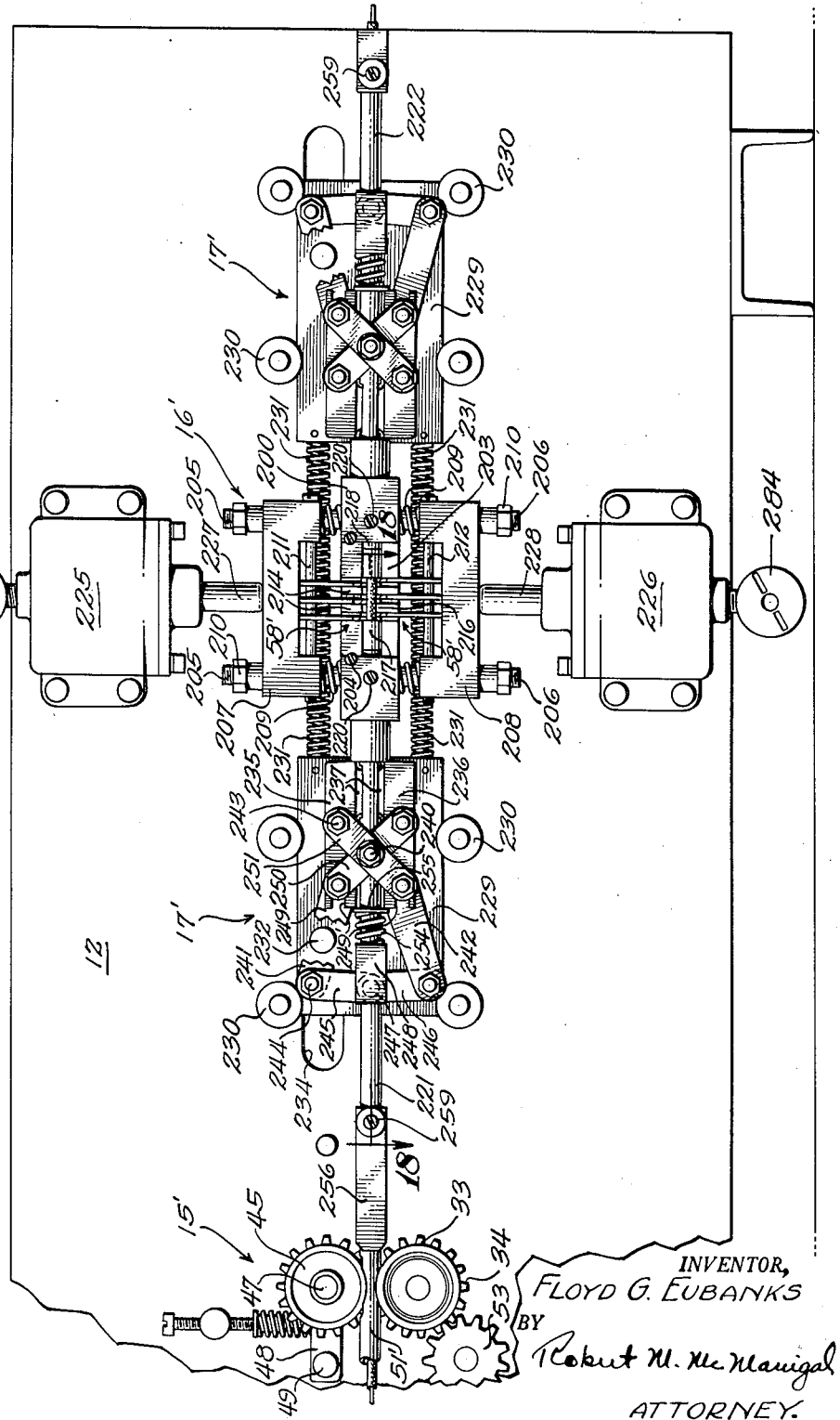

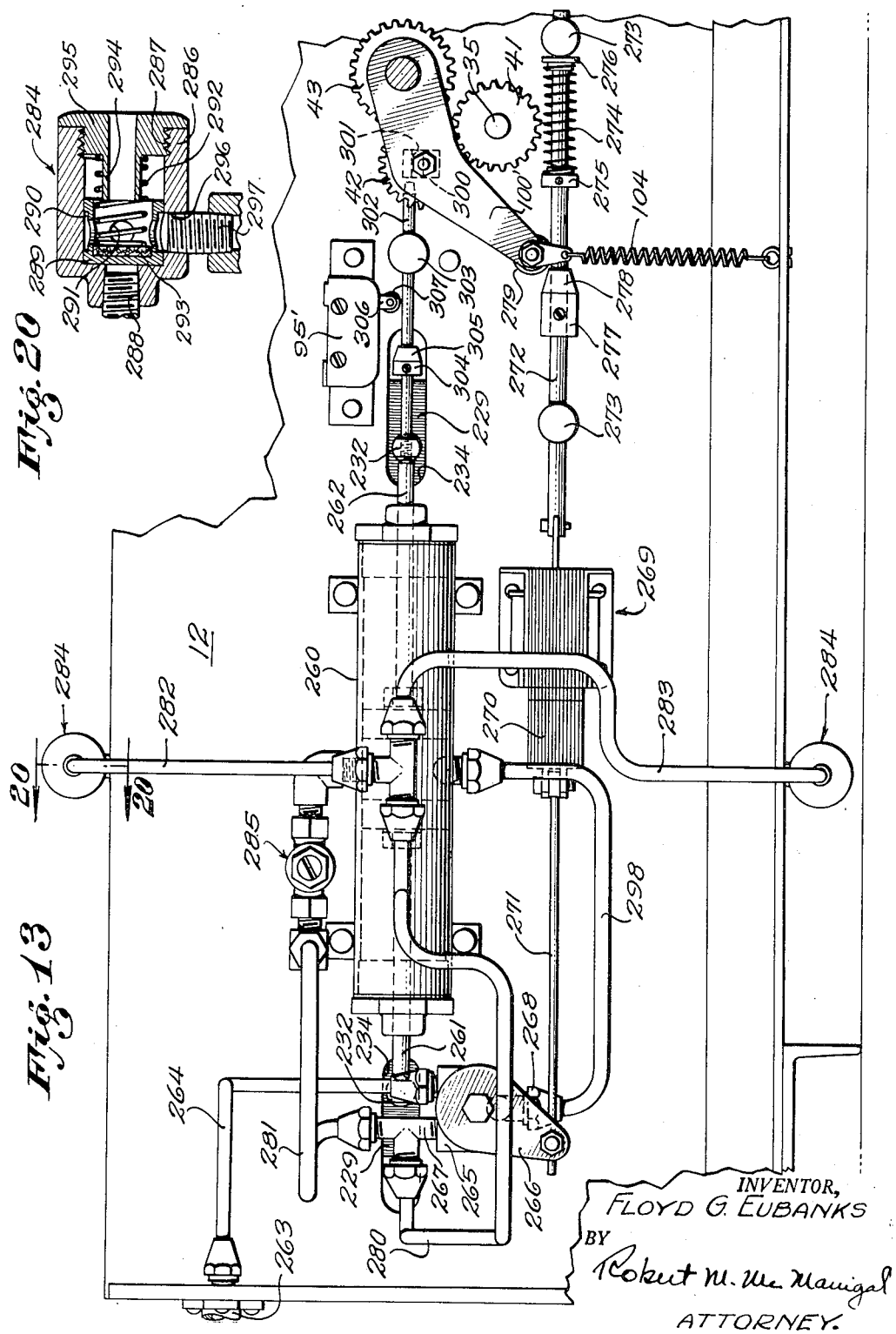

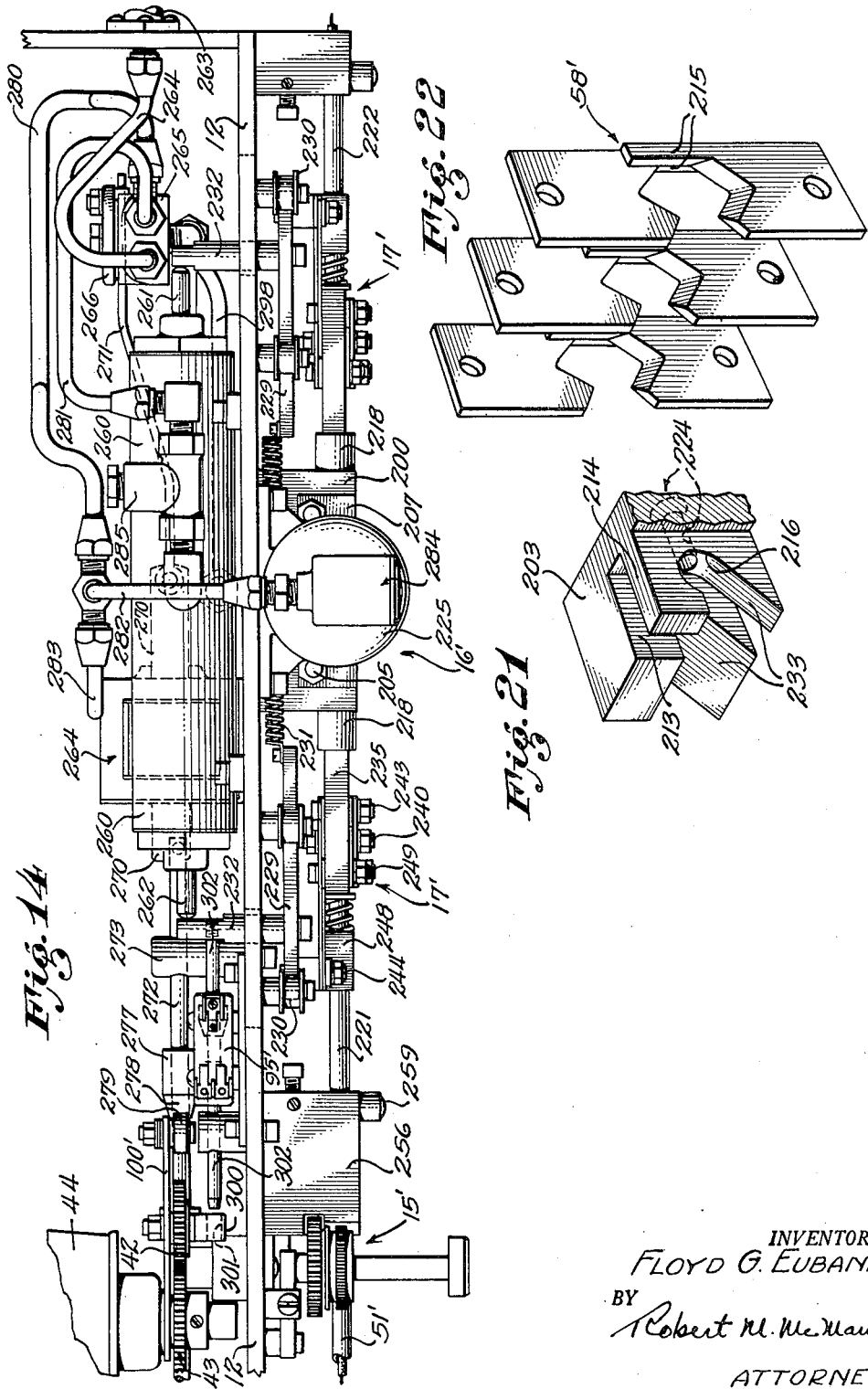

Oct. 29, 1957 F. G. EUBANKS 2,811,063
WIRE CUTTER AND INSULATION STRIPPING APPARATUS
Filed Sept. 8, 1953 11 Sheets-Sheet 10
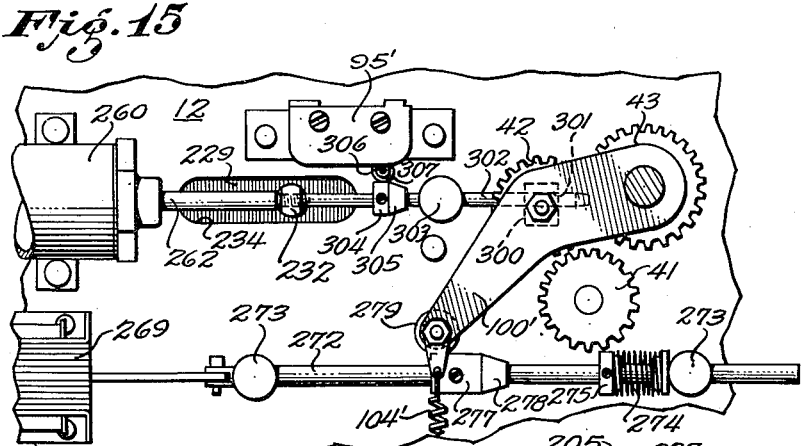
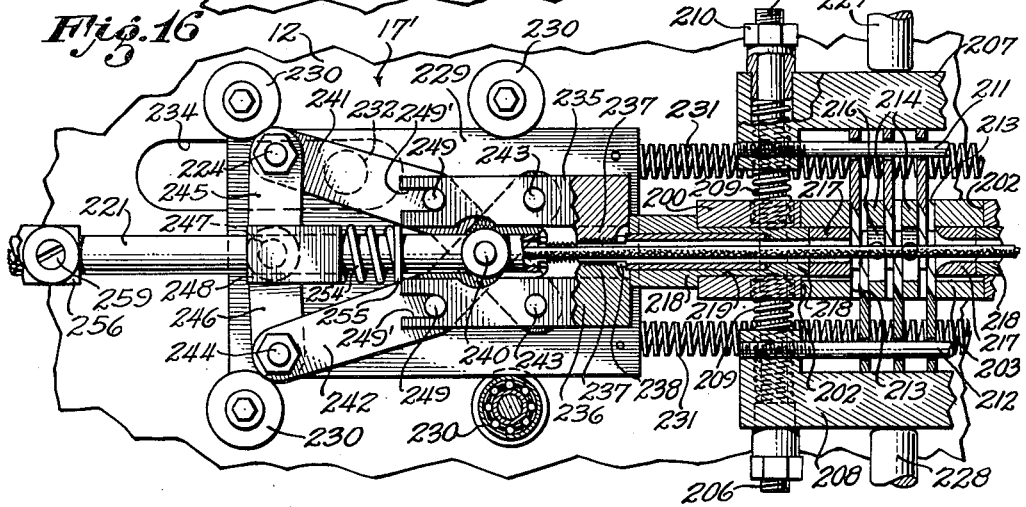
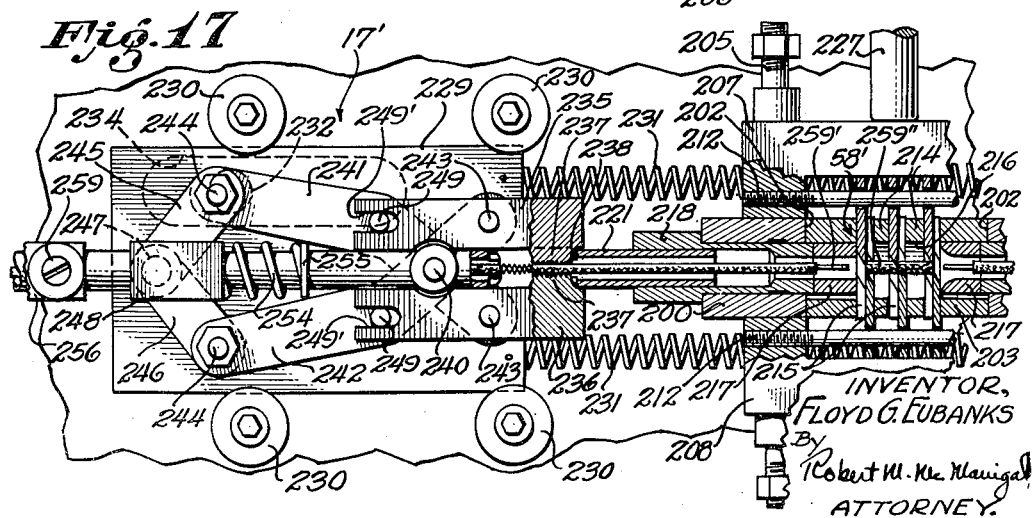
INVENTOR,
FLOYD G. EUBANKS
By Robert M. McManigal
ATTORNEY.

Oct. 29, 1957 — F. G. EUBANKS — 2,811,063
WIRE CUTTER AND INSULATION STRIPPING APPARATUS
Filed Sept. 8, 1953 — 11 Sheets-Sheet 11
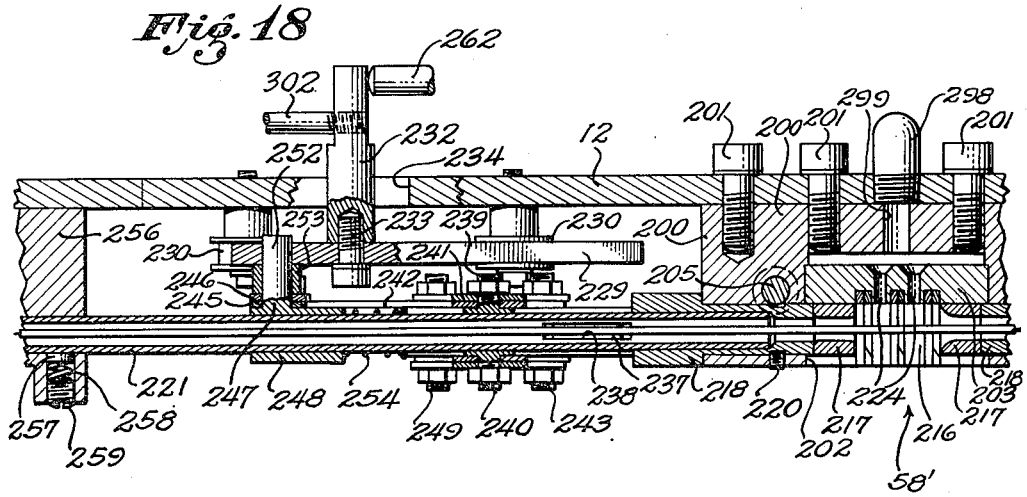
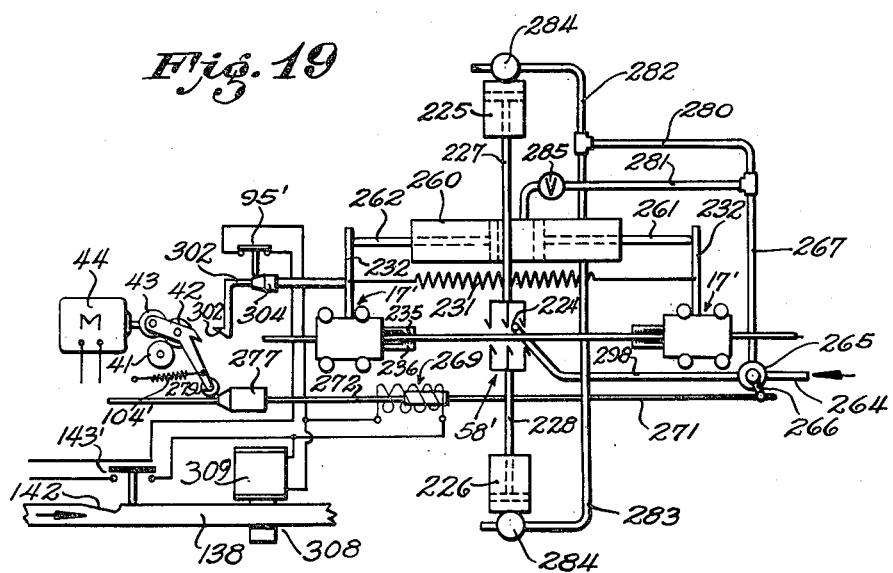
INVENTOR,
FLOYD G. EUBANKS
BY Robert M. McManigal
ATTORNEY.

United States Patent Office 2,811,063
Patented Oct. 29, 1957

2,811,063

WIRE CUTTER AND INSULATION STRIPPING APPARATUS

Floyd G. Eubanks, Pasadena, Calif., assignor of ten percent to Robert M. McManigal, South Pasadena, Calif.

Application September 8, 1953, Serial No. 378,732

11 Claims. (Cl. 81—9.51)

The present invention relates generally to the art of severing filament like materials into predetermined lengths, and is more particularly concerned with apparatus for the high-speed cutting and stripping of insulated wire, and the like.

It is an object of the herein described invention to provide apparatus for the cutting and stripping of filamentary materials, such as insulated electrical wire, which is of simple construction, light-weight so that it may be readily portable, and yet having cooperatively associated parts so arranged that the apparatus may be operated with an extremely high degree of flexibility.

A further object is to provide in one embodiment of apparatus of this character an arrangement of component parts which are primarily electrically operated and interconnected, instead of conventional arrangements in which the parts are associated and coordinated mechanically.

It is a further object to provide in another embodiment of apparatus of this character, an arrangement of component parts which are pneumatically powered and actuated.

It is a further object to provide novel length and cycling control mechanism, which is quick and positive in operation, and which incorporates simple adjusting and regulating means for determining the length settings merely by actuating a dial which is graduated and calibrated for predetermined lengths.

Another object is to provide novel electrical control which includes an electro-magnetic batch counter which will automatically shut down the apparatus upon a predetermined number of lengths being cut and counted by the batch counter.

Another object is to provide in connection with a filamentary material cutting apparatus, a novel mechanism which will strip the ends of insulation from a filamentary material such as wire having an insulating covering.

Still another object is to provide novel means for pneumatically removing the stripped insulation portions.

A still further object is to provide an improved mounting and guiding means for the pairs of cutters in the form of a block insert having transverse slots which determine the spacing between the pairs of cutters. Thus by providing a series of block inserts having different spacings, it is possible to quickly and easily change the apparatus so as to vary the length of the insulation portions which are to be stripped from the filamentary material.

It is also an object to provide in apparatus of the herein described type, novel cutting mechanism which is associated and interlocked with unique means for terminating the material feed during the cutting operation.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a plan view of apparatus embodying the features of the herein described invention;

Fig. 2 is an elevational view of the same;

Fig. 3 is a rear view, portions of the enclosing housing being cut away to disclose the physical relationship of certain of the comopnent parts of the apparatus;

Fig. 4 is an enlarged transverse sectional view of the cutter and its actuating mechanism, taken substantially on line 4—4 of Fig. 3;

Fig. 5 is a perspective view showing the details of the cutter knives and their construction;

Fig. 6 is an enlarged fragmentary view in which a section is taken substantially on line 6—6 of Fig. 4 to show details of the mechanism for interrupting material feed during cutting operations;

Fig. 7 is an enlarged fragmentary section taken substantially on line 7—7 of Fig. 6, and showing details of the driving mechanism of the stripper rollers;

Fig. 10 is an enlarged fragmentary view of the master controller, including a horizontal section taken substantially on line 10—10 of Fig. 3;

Fig. 12 is an elevational view of the pneumatic embodiment of the present invention;

Fig. 13 is a rear view of the same, showing details of the control mechanism for energizing and deenergizing the power cylinders;

Fig. 14 is a plan view of the pneumatic embodiment;

Fig. 15 is an enlarged fragmentary view in elevation of the means for inactivating the feeding mechanism during the cutting operation, and reactivating the same at the conclusion of the cutting operation;

Figs. 16 and 17 are enlarged fragmentary views illustrating the action of the stripping mechanism;

Fig. 18 is a longitudinal section, taken substantially on line 18—18 of Fig. 16;

Fig. 19 is a view diagrammatically illustrating the pneumatic and mechanical interconnection of the components of the pneumatic embodiment of the invention;

Fig. 20 is a detailed view showing one of the quick exhaust valves in section;

Fig. 21 is a perspective fragmentary view showing details of construction of the block insert for determining the spacing between the pairs of cutter blades; and Fig. 22 is a perspective view showing the details of construction of the cutter knife, such as utilized with the pneumatic embodiment of the invention.

*The apparatus in general*

Figure 8:
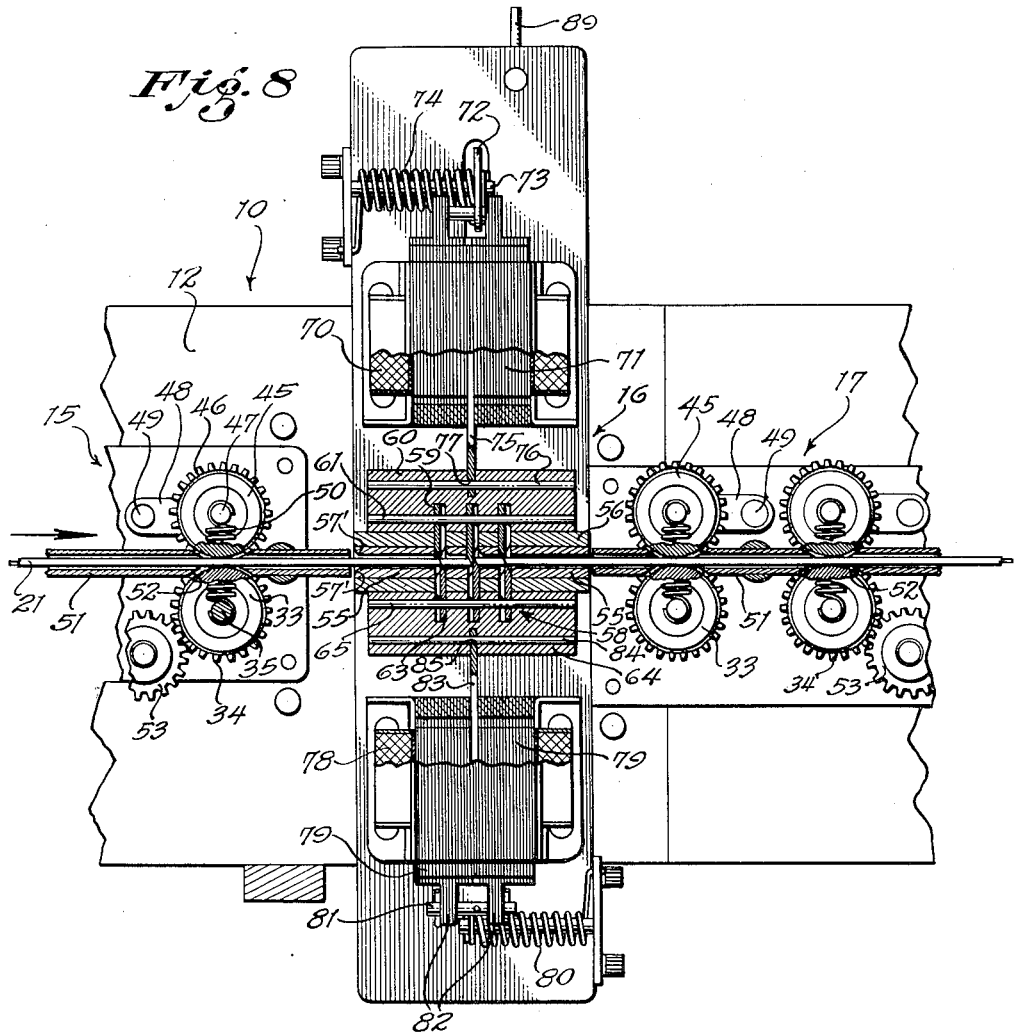
Fig. 8 is an enlarged fragmentary view including a vertical section through the cutting mechanism, taken substantially on line 8—8 of Fig. 4, and having cutaway portions to show the association of the feeding rollers with the material.

The features of the present invention have been incorporated into two types of apparatus. One of these has been termed the "Electrical embodiment" and will be described firstly, while the other has been termed "The pneumatic embodiment," and will be described secondly, with particular attention to the portions thereof which differ over the electrical arrangement.

*The electrical embodiment*

As shown generally in Figs. 1, 2 and 3, the component parts of the cutting and stripping apparatus of the present invention are mounted upon an elongate combined housing and supporting panel 10 fabricated from suitable sheet metal material and mounted on spaced pads or feet 11. These pads are arranged to be anchored to a supporting surface and support the housing in a slightly raised position.

In general, the housing has a front wall 12 which serves as a mounting panel for certain component parts of the apparatus, as will hereinafter be described in detail. In order to provide convenient access to the interior of the housing and certain of the component parts contained therein, the housing may have a back wall structure composed of removable panel sections 13 which are arranged to be retained in assembled relation with the other parts of the housing by means of removable holding thumb screws 14.

In its broad aspect, the apparatus is in the main composed of a number of component assemblies which will subsequently be described in detail. Briefly these assemblies may be referred to as the feeding mechanism 15, a cutting mechanism 16, a stripping mechanism 17, a master tape cycle control 18, length control 19 and batch control 20.

In its broad concept, the apparatus is susceptible of general application for the cutting of different types of filamentary material such as wire, cord, rubber and other filamentary material composed of different substances. However, it is believed that the various component parts will be more clearly understood if described in connection with the cutting and stripping of insulated wire such as commonly employed for electrical wiring purposes.

When utilized for the foregoing purpose, the wire, as generally indicated by the numeral 21, is fed from a rotatably supported reel 22 positioned in a convenient location adjacent the left end of the apparatus as viewed in Figs. 1 and 2.

The feeding mechanism

The wire 21 is guided to the feeding mechanism by passing it through an elongate tube 22 supported on the front wall 12 of the housing by means of spaced brackets 23—23. Upon leaving the tube 22, the wire passes through a pressure applying device 24 to the feeding mechanism which operates to feed the wire to the cutting mechanism 16.

The pressure applying device is adjustable so that pressure may be placed against the wire prior to its entering the feeding mechanism to press it against a measuring wheel 25 by an associated wheel 26 between which the wire is fed. The wheel 26 is rotatably supported on an arm 27 which is pivotally mounted at one end on a pivot 28 for swinging movement. At its outermost end, the arm 27 carries a reciprocably mounted pin 29 which is supported resiliently by a coil spring 30 in such a manner as to bias the pin in an upward direction against a graduated cam member 31 having an actuating handle 32 which enables rotation of the cam. By adjusting the cam 31, the pin 29 may be moved towards or away from the spring 30 so as to increase the pressure or decrease the pressure as desired with which the wheel 26 will press the wire against the wheel 25. Thus the wheel 26 acts to press the wire against wheel 25 and prevent relative slippage as it is fed through the feeding mechanism 15.

The feeding mechanism comprises a plurality of sets of feed rollers, in the present instance three sets of feed rollers. As best shown in Fig. 8, each set of feed rollers consists of a lower wire engaging roller 33 and a connected pinion 34 which are carried by a rotatably mounted shaft 35. These parts are cooperatively associated in the same manner as similar feed roller assemblies incorporated in the stripping mechanism 17, and as specifically shown in Fig. 7. The pinion 34 is shown as being in threaded engagement with the shaft 35, while an interlocking pin 36 interconnects the roller 33 and pinion 34, the roller being retained upon the end of shaft 35 by means of a retaining screw 37 and associated washer 38.

As there shown, the shaft 35 is supported in a conventional bearing bracket 39 which supports suitable antifriction bearings 40. The bearing bracket 39 is supported upon the front wall 12 of the housing in any suitable manner, and the end of the shaft 35, which projects rearwardly of the wall 12, is provided with a pinion 41. This pinion is connectible, in a manner to subsequently be described in detail, with an idler pinion 42 having driving engagement with a gear 43 driven by a suitable electric motor 44, as shown in Figs. 3 and 6.

As shown in Figs. 2 and 8, the lower roller 33 of each set is operatively associated with an upper roller 45 which is connected to an associated pinion 46 and mounted for rotation upon a shaft 47 supported at the outermost end of an arm 48 which is supported for swinging movement upon a suitable pivot 49. The shaft 35 and shaft 37 are interconnected by a tension spring 50 which acts to retain the pinions 34 and 46 in meshed driving relationship, and the rollers 33 and 45 in engagement with the wire which is passed therebetween. The wire is guided through the feed rollers by a guide tube 51 which has cutout portions 52 for respectively permitting the feed rollers to engage the wire.

As will be seen by reference to Figs. 2 and 8, the subsequent sets of feed rollers are driven from the right hand set by means of idler gears 53 which meshes in each case with the pinions 34 of adjacent sets of feed rollers.

In order to enable the wire to be initially fed while threading it through the subsequent cutting mechanism 16 and stripping mechanism 17, provision is made for manually actuating the feed rollers of the feeding mechanism 15. As shown primarily in Figs. 1 and 2, the shaft 35 of the feeding mechanism which is connected with the pinion 41, has its opposite end extended and connected with a manually operable knob 54 which is conveniently accessible on the forward side of the apparatus for manual manipulation during the wire threading operation. Upon leaving the feeding mechanism, the wire is led from the end of tube 51 into the cutting mechanism, the details of construction of which will now be described.

The cutting mechanism

Referring now to Figs. 4 and 8, the wire is conducted from the tube 51 of the feeding mechanism through a series of tubular bushings 55, which are supported in a stationary block 56 affixed to the front wall 12 by suitable mounting screws 57. The entrance end of the bushings 55 is rounded as shown at 57' so as not to damage the entering wire.

As shown primarily in Fig. 8, the bushings and block have vertical slots or passages in which a plurality of sets of cutting blades 58 are positioned. A blade 59 of each set is connected in a head member 60 by means of a pin 61 which passes through an aperture in each of the associated blades, this aperture being indicated by the numerals 62 of Fig. 5 showing the details of the blade construction. In a similar manner, a blade 63 of each set of cutting blades is secured into a lower head member 64 by means of a pin 65 which passes through apertures 66 in the blade ends.

As shown in Fig. 5, the two cutting blades of the central set are provided with end opening slots 67 which are respectively terminated at their innermost ends in a crescent shape cutting edge 68. These two blades comprise the cutters which sever the wire conductor. As a consequence, these blades are supported in the head members and are so arranged that when the head members are moved towards each other, the cutting edges pass each other so as to completely sever the wire.

The other two sets on each side of the centrally arranged set constitute the blades which sever the insulation only of the wire. These blades are similarly constructed to those just described for the central set of blades, except that in this case the crescent shaped cutting edge is provided centrally with a notched auxiliary cutting edge 69. These edges 69 are formed so that when the blades are closed sufficiently to cut the insulation, the conductor will extend through the notches 69 and will therefore remain unsevered, the insulation only being severed by these blades.

In the illustrated embodiment of the present invention, provision is made for actuating the cutter blades by electromagnetic means comprising an upper solenoid coil 70 which is operatively associated with a plunger 71 suspended from the outermost end of an arm 72 having a pivotal supporting pin 73 intermediate its ends. The arm 72 is biased in a clockwise direction by a spring 74 which acts to normally maintain the plunger 71 in a raised position, when the coil 70 is deenergized. This plunger is connected through a link 75 to the upper head member 60, a retaining pin 76 extending through an opening 77 in the lower end of the link 75. Thus, when the coil is deenergized, the blades 59 will be retained in raised noncutting position.

Similarly, a lower solenoid coil 78 is associated with a plunger 79. This plunger is biased in a downward direction by means of a coil spring 80 having one end anchored and its other end secured to a pin 81 supported in a pair of spaced lugs 82 at the lower end of the plunger. The upper end of the plunger 79 is connected through a link 83 with the lower head member 64, a pin 84 extending through an aperture or opening 85 in the upper end of the link 83. With this arrangement, the spring 80 thus acts to normally maintain the lower head member 64 and the blades 63 carried thereby in a lowered or noncutting position of the blades, when the associatied coil 78 is in a deenergized condition.

Upon energization of the coils 70 and 78, the associated plungers 71 and 79 will be actuated towards each other, this movement carrying the blades into cutting position. Upon deenergization, the springs 74 and 80 will act to restore the blades to noncutting position.

The cutting blades should be actuated together, and in order that their movement may be synchronized, the upper head member 60 is mechanically interlocked with the lower head member 64 by a pair of crossed bars 86 and 87, as shown in Fig. 2, these crossed bars being pivotally supported intermediate their ends upon a common pivot pin 88 supported and projecting from the forward edge of the block 56. The upper ends of the crossed bars each have a slot and pin connection with the upper head member 60, while these lower ends of the crossed bars each have a slot and pin connection with the lower head member 64. The head members are thus interlocked for unitary movement.

Referring now to Figs. 4 and 6, the rearward end of the arm 72 extends through an extension of the front wall 12 and is connected to a rod 89 which is supported in a vertical position for reciprocable movement on supporting post 90 placed at spaced intervals and secured by appropriate means to the rear surface of the wall 12. When the coils 70 and 78 are deenergized, the rod 89 normally occupies a lowermost position as shown in Fig. 4, but when the coils are energized the rod is moved towards its upper position as shown in Fig. 6. Intermediate its ends, the rod 89 carries a pair of abutments 91 and 92 which are adjustably affixed for varied spacing. These abutments are spaced apart and are adapted to engage a projection 93 of a pivoted arm 94 which is adapted to open and close the contacts of a switch mechanism 95. This switch mechanism has contacts which are in an energizing circuit of the control for the coils 70 and 78, and are so arranged that these coils will be deenergized just prior to the actual cutting operation. Thus, the cutting blades will be free to be restored to noncutting position at the conclusion of the cutting operation. This control will subsequently be explained in detail.

A primary feature of the cutting operation resides in provision of means for terminating the feeding and stripping operations so that the wire will in fact be severed during a period of non-movement.

Before explaining the mechanism by which this feature is accomplished, it should be pointed out that the first feed roller 33 of the stripping mechanism, as shown in Fig. 7, is driven through an idler gear 96 which is operatively associated with an idler pinion 97 in continuously meshed connection with a main driving gear 98 driven by a separate motor 99.

The idler pinions 42 and 97 are respectively carried by rocker arms 100 and 101 which are respectively mounted for swinging movements about the axis of rotation of gear 43 and gear 98, whereby their associated idlers 42 and 97 may be moved into and out of meshed engagement with the gears 41 and 96, respectively.

The rocker arm 100, as shown in Fig. 6, has a leg 102 which extends past the rod 89 into the line of movement of an abutment member 103 carried by the rod and being adapted to engage the underedge of the leg 102 and move it upwardly, when the rod is raised, so as to carry the idler pinion 42 out of engagement with the pinion 41 and thus disconnect driving power from the feeding mechanism, during the actual cutting operation. A spring 104 normally biases the rocker arm 100 in a direction to engage the idler pinion 42 with pinion 41 to establish a driving connection with the feeding mechanism, when the cutters are moved to noncutting position.

A pin 105 adjacent the outer end of the leg 102 extends below an adjacent leg 106 of the rocker arm 101 so as to simultaneously move it upwardly in a direction to disengage the idler pinion 97 from gear 96 so as to terminate the driving of the stripping mechanism during the actual cutting operation. In a similar manner, a spring 107 biases the rocker arm 101 in a direction to restore meshed relation between the idler pinion 97 and gear 96 and thus connect the driving power with the stripping mechanism after the cutting operation.

In order to further facilitate initial threading of the wire through the feeding mechanism by manual manipulation of the knob 54, as previously explained, and prevent overrunning of the feeding mechanism when stopping the apparatus, it is desirable that the idler pinions 42 and 97 shall be disengaged immediately from their associated pinions 41 upon deenergization of the driving power. This is accomplished by a mechanism which will now be described, and which operates to raise the legs 102 and 106 upwardly out of contact with abutment member 103, but which will operate to release these legs for normal operation during the ordinary cutting and stripping operation of the apparatus.

For the foregoing purpose, there is provided on the rear side of the wall 12 within the housing 10, a solenoid coil 108 which is operatively associated with a plunger 109, this plunger being normally biased to a raised position by means of a spring 110. As shown in Fig. 4, the pin 105 projects rearwardly of the leg 102 so that its rear end is in the line of movement of a part of the plunger 109. Thus, in the upward position of the plunger 109, the legs 102 and 106 will be elevated with respect to the abutment member 103 so as to move the idler pinions 42 and 97 out of driving engagement with the pinion 41 and gear 96. However, upon energization of the coil 108 by control which will subsequently be described, so that it will be energized during normal operation of the machine, the plunger will be pulled downwardly against the action of spring 110 and thus release the legs 102 and 106 for movement back to a position wherein they are cooperatively associated with the abutment member 103 for normal operation during cutting of the wire.

*The stripping mechanism*

The stripping mechanism comprises a plurality of sets of rollers which are mounted in a similar manner to the rollers of the feeding mechanism. The stripping mechanism does differ from the feeding mechanism, however, in that instead of driving the sets subsequent to the first set of rollers through idler gears 53, provision is made for driving the subsequent sets of rollers through a slip clutch arrangement which will now be described.

As shown in Fig. 6, the gear 96 continually meshes with a pinion 110 of such ratio that it may drive an associated shaft 111 at double the speed with which the shaft 35 is driven through the pinion 41.

The shaft 111 is supported in antifriction bearings, Fig. 7, in the same manner as shaft 35, and is held against endwise movement by means of a retaining collar 112 which is secured to the shaft by means of a pin 113.

The pinion 110 is rotatably supported upon a contracted end portion 114 of the shaft 111 with a friction disc 115 of fibre or other suitable material positioned on each side thereof. By means of an adjustable nut 116 in threaded engagement with the outer end of the contracted shaft portion 114, a spring washer 117 may be forced against an associated washer 118 interposed between it and the adjacent friction disc 115. It is believed that it will be apparent that by adjusting the nut 116, a slip driving connection will be obtained between the pinion 110 and the shaft 111.

A stripping operation, by means of the stripping mechanism just described, will now be explained. Let it be assumed that the cutters operate in a normal manner to provide a desired length of wire section with severed insulation sections respectively on the leading and following ends, which are to be removed by the stripping mechanism.

The feed rollers and the first set of stripping rollers will all operate at the same speed to feed the wire section in a direction to bring its leading end to the second set of stripping rollers. The drive of the second and third stripping rollers being through the friction clutch, these rollers will be free at this time to operate at their increased speed. Therefore, when the leading end insulation section passes under the second set of rollers, the wire section will be held at the lower feeding speed while the second set of stripping rollers operating at the higher speed will quickly move the insulation section ahead, thus stripping it from the associated conductor end.

Now, as the body of the wire section is passing under both the first and second sets of stripping rollers they will operate at the lower feeding speed. Therefore, when the following end of the wire section reaches a position in which the insulation section passes under the first set of stripping rollers, the second set of stripping rollers will be free to operate at their higher speed and move the wire body and following conductor end quickly ahead, thus stripping the following end insulating section from the associated conductor end.

The stripped insulation sections are carried forwardly through the tube 51 associated with the stripping rollers and are discharged upon reaching the tube end.

*The master tape cycle control mechanism*

Figure 9:
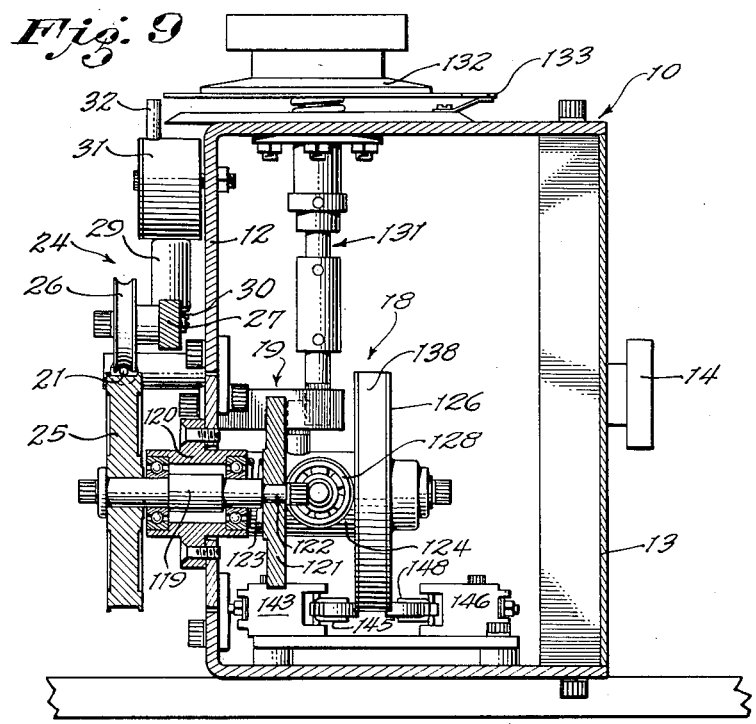
Fig. 9 is an enlarged transverse sectional view through the apparatus, taken substantially on line 9—9 of Fig. 3, and showing details of the variable speed drive for the master control mechanism.

Referring now to Figs. 9 and 10, the measuring wheel 25 of the pressure applying device is shown as being carried upon a shaft 119 which is supported upon a section of the front wall 12 by means of a suitable antifriction bearing assembly 120. The end of the shaft 119, which is positioned within the housing 10, is provided with a driving disc 121, this disc being slidably supported upon a reduced shaft section 122 and biased towards the end of the shaft section by means of an expansion coil spring 123. Adjacent the driving disc 121, a rearwardly projecting post 124 is secured to the wall section by means of a mounting screw 125. The opposite or projecting end of this post carries a rotatably mounted pulley 126, this pulley being mounted upon a conventional antifriction bearing assembly 127.

The driving disc 121 and the pulley 126 are cooperatively associated with an idler roller 128 adapted at diametrically opposite sides to frictionally engage the confronting faces of the driving disc 121 and pulley 126 so as to form a friction drive therebetween which may be adjusted to vary the speed at which the pulley 126 will be actuated. The idler roller 128 is rotatably mounted at one end of a rack member 129 which is supported for endwise movement in the post 124. The teeth of the rack 129 mesh with the teeth at one end of a rotatably mounted counter shaft 130, the counter shaft having teeth at its other end which mesh with the teeth at an associated end of a shaft assembly 131. The shaft assembly 131 extends upwardly through the top of the housing 10 and is connected with a dial knob 132 mounted in a suitable support for rotational movement. The dial knob, as shown in Fig. 1, carries graduations which are cooperatively associated with vernier graduations carried by a sector plate 133 supported at the edge of the dial knob. The function of the dialing arrangement just described will be more fully explained in connection with the description of the length control by which the lengths of wire or filamentary sections to be cut is determined.

As shown in Fig. 10, a second pulley 134 is rotatably mounted upon a post 135, this post being slidably connected with the front wall 12 by a screw member 136 having a shank portion which is slidable longitudinally of a slot 137. The pulleys 126 and 134 are interconnected by means of a band or tape 138 of suitable material. The tension applied to the tape 138 may be readily changed, and different lengths of tape accommodated, by adjusting the position of the post 135 along the slot 137. Finer adjustments are accomplished by means of a screw 139 having its threaded end in threaded engagement with the post 135, and its head end rotatably supported in a post 140 which is also slidably supported for adjustable movement with respect to the slot 137 by means of a screw 141.

The utilization of a variable friction drive for actuating the pulleys 126 and 134 with the tape 138 thereon provides an arrangement having a high degree of flexibility permitting a wide range of speed variation in the drive of the tape. While such a drive has been illustrated in the present instance, it will be appreciated that the pulley 126 might be driven through a gear transmission, and that the speed could in such case be changed by the use of gears of different ratios.

As shown in Fig. 10, the tape 138 is provided with marginal edge notches 142. The opposite edges of the tape 138 are associated with sets of control switches, one set of switches being designated generally at A and comprising the switches 143 and 144, each of which has an actuator arm 145 bearing against the associated edge of the tape.

In a similar manner, there are provided on the opposite side of the tape a pair of switches 146 and 147 which constitute a set designated at B. Each of these switches has an actuating arm 148 arranged to bear against the associated edge of the tape 138. These switches have contacts which are normally maintained in opened position, when the switch arms are in engagement with the normal edge of the tape 138. However, upon a notch 142 reaching one of the arms, the arm is permitted to move to a position which closes the contacts of the switch with which it is associated. The switches associated with the tape 138 constitute the primary control for determining the actuation of the cutting mechanism. The details of this control will subsequently be described more specifically.

*The cutting length control*

Provision is made for selectively utilizing the switches of set A or the set B, depending upon the length of filamentary material to be cut. In each case, the actuation of the switch 143 or 146 determines the cutting operation, so that it will be readily apparent that the interval between these operations will determine the cutting length. Moreover, it will be appreciated that the interval of cutting will depend upon the spacing of the notches 142 along the tape, and also the speed of movement of the tape.

In the arrangement described, it is proposed to utilize a spacing on one side of the tape, for example, a spacing of notches which are cooperative with the switches 143 and 144, such that a 1:1 ratio is obtained in which the tape is moving at the same speed as the filamentary material and a three inch length will be cut when the dial knob 132 is set at zero. If desired, the notches in the tape which are associated with the switches 146 and 147 may be of greater spacing. While the ratio between the notch spacing on the one side with respect to that on the other side may be of any desired value, at the present instance the notch spacing on the side associated with the switches 146 and 147 has been utilized which is six times greater than the spacing on the side associated with the switches 143 and 144. Thus, if control is shifted to set B, wires of eighteen inches in length would be cut instead of three inches.

In addition then to being able to vary the cut wire lengths by a ratio depending upon the relationship of the notch spacing on one side of the tape with respect to the notch spacing on the other side of the tape, additional ratios may be obtained by actuation of the dial knob 132 to move the idler roller 128 towards or away from the axis of rotation of the driving disc 121.

The dial knob 132 is graduated from zero to 100, and by utilizing standard graduations, it is possible to calibrate the dial so that the particular cutting length for each graduation will be determined, and it will then only be necessary to set the dial to this graduation to get a specific desired length. For example, the dial graduations may indicate a three-inch wire length for a zero dial setting, a seven inch wire length for a setting of the dial at 50, etc.

By utilizing a master tape 138 in which the notches 142 are uniformly spaced, cyclic operation will be obtained, wherein for a given setting of the dial 132, a plurality of filamentary lengths of the same length will be cut. However, it will be appreciated that by utilizing a master tape in which the notches are placed at proper varied intervals, each complete movement of the tape may be utilized to cut a predetermined series of lengths of different length, or a predetermined number of one length and a different number of another length. The utilization of a master control tape such as described lends itself to a high degree of flexibility and to different cyclic operations, as desired.

The batch control

Utilization of an electro-magnetically actuated cutting mechanism as previously described permits using an electro-magnetic type of batch control as previously identified by the numeral 20. Briefly, the batch control comprises suitable mechanism which may be adjusted by means of a suitable dial knob 149 and associated vernier section 150, as shown in Figs. 1, 2 and 3. The mechanism is arranged to be actuated simultaneously with each cutting operation, and is connected into the control circuit in a manner to be hereinafter explained, so that upon a predetermined number of operations, as determined by the dial setting, the controller will open normally closed contacts 151 which are connected in a stopping or de-energizing circuit of the apparatus.

The electrical control in general

Figure 11:
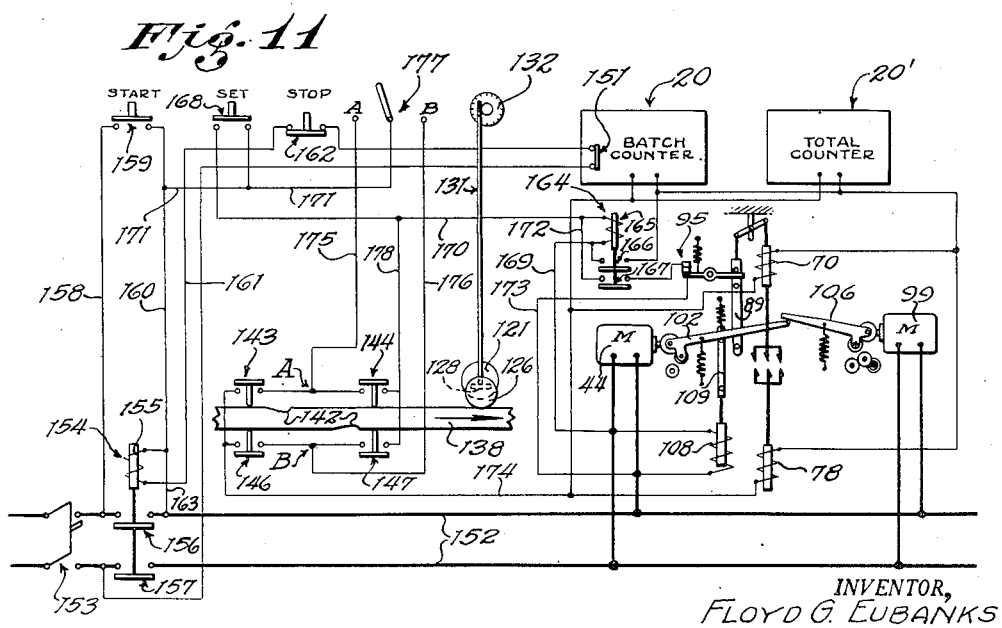
Fig. 11 is a view schematically illustrating the electrical and mechanical components of the apparatus and their interconnection with the master control.

Referring now to Fig. 11, a main circuit 152 is connected with an electrical source through a double-pole main line switch 153. With the main switch 153 in closed position, the main circuit is fed through a line contactor 154 having an energizing coil 155 and normally opened contacts 156 and 157. The coil 155 is energizable through a circuit as follows: from one side of the main circuit 152, a head of contacts 156, through a conductor 158, the contacts of a start switch 159, a conductor 160 to one side of the coil, from the other side of the coil through a conductor 161, the normally closed contacts of a stop switch 162, contacts 151 of the batch counter, and thence back to the other side of the main circuit, ahead of contacts 157. Closure of the contacts of start switch 159, energizes the coil 155 causing contactor 154 to operate and close contacts 156 and 157 so as to energize the main circuit 152. The contactor is retained in closed position by a holding circuit through a conductor 163 which forms a shunting connection around the start switch and is connected with the same side of the main circuit as conductor 158, except on the opposite side of contacts 156. Energization of the main circuit starts the motors 44 and 99. Opening of the contacts of stop switch 162 or contacts of 151 of the batch counter will open the energizing circuit of coil 155 and cause the contactor 154 to be deenergized, whereupon opening of its contacts deenergizes the main circuit 152.

As previously explained, the plunger 109 normally maintains the legs 102 and 106 in raised position to aid threading of the filamentary material and prevent over-running of the feeding mechanism when shutting down the apparatus. However, upon the main circuit 152 being energized, the solenoid coil 108, which is connected across the main circuit, will act to pull down the plunger 109, and thus release the legs 102 and 106 for action under their respective springs to connect the feed rollers and stripping rollers with their driving motors 44 and 99 respectively. Operation of these rollers will continue to feed the filamentary material, but no cutting operations will take place until a pre-set relay 164 is first energized. This relay has an operating coil 165 and normally opened contacts 166 and 167.

The cutting operations are initiated by closing the contacts of a set switch 168 which energizes the coil 165 through the following circuit: from one side of the main circuit 152 through conductor 169 to one side of coil 165, from the other side of the coil through conductor 170, the contacts of said switch 168, to conductor 171, conductor 160, and thence through conductor 163 to the other side of the main circuit 152.

Operation of the pre-set relay 164, causes it to close its contacts, contacts 166 operating to connect the live conductor 169 with one side of the batch counter 20, the total counter 20', and the solenoid coils 70 and 78. The contacts 167 connect the other terminal of the coil 165 through a holding circuit consisting of conductor 172, contacts 167, thence through the contacts of switch 95, and conductor 173 back to the other side of the main circuit 152. The other terminals of the batch counter, total counter, and solenoid coils 70 and 78 are connected through a conductor 174 to branch parallel circuits containing switches 143 and 146, and which are connected by conductors 175 and 176 to the terminals of a double-throw switch 177 which may be selectively actuated to connect either of the conductors 175 or 176 with conductor 171, and thence through conductors 160 and 163 to the other side of the main circuit.

Selective actuation of the switch 177 determines the ratio of the cutting intervals, that is, whether the cutting interval will be determined by closing the contacts of switch 143, or switch 146, as previously explained in connection with the master tape cycle control mechanism description. As will be noted, the switches 144 and 147 are respectively associated with switches 143 and 146. The switches 144 and 147 are selectively operable, depending upon the position of switch 177, to provide shunting control connections around the manually operable set switch 168, for a purpose to be explained subsequently.

Upon closure of switch 143 or switch 146 by the passage of an associated notch 142 in the tape 138, the solenoid coils 70 and 78 will be energized to produce a cutting operation. As a result of this cutting operation, the rod 89 moves upwardly and opens the contacts of switch 95 just prior to completion of the cutting operation, so that the holding circuit of the pre-set relay operating coil 165 will be opened, thus permitting this relay to drop out and open its contacts. As soon as contacts 166 open, they deenergize the circuit to the batch counter, total counter, and the solenoid coils 70 and 78. Simultaneously, the action of rod 89 raises arms 102 and 106 so as to disconnect the feeding and stripping rollers from their respective driving motors and terminate movement of the material during the cutting operation.

Now, when the notch which has caused the switch 143 or 146 to operate reaches either the switch 144 or 147, the connected switch will be closed and thus act to energize the coil 165 of the pre-set relay through the following circuit: from the live conductor 171, through conductor 175 and switch 144 or conductor 176 and switch 147 depending upon the position of switch 177, and thence through conductor 178, conductor 170 to one side of coil 165, from the other side of the coil through conductor 169 to the other side of the main circuit 152. Thus, the actuating mechanism for the cutting operation will be pre-set after the switch controlling the cutting operation is closed by the operation of the tape 138.

The cutting operations will continue, each cutting operation being registered on the batch counter, and when the number of operations have been completed as determined by the setting of the batch counter, this counter will operate to open its contacts 151 and interrupt the holding circuit of coil 155 of the line contactor 154 which will then open and deenergize the main circuit 152 so as to shut down the apparatus until it is desired to start the next cycle of operations or the cutting of the next batch of filamentary material.

*The pneumatic embodiment*

This embodiment of the invention differs from the electrical embodiment previously described primarily in the cutter details, the manner of stripping the insulation, and the medium utilized as power, mainly for the cutting and stripping operations. This embodiment incorporates a feeding mechanism, batch counter and control similar to that previously described in connection with the electrical embodiment.

*The cutting mechanism*

In the pneumatic embodiment, as shown in Fig. 12, the cutting mechanism 16' comprises a somewhat different arrangement of parts in which a stationary block 200 of generally horizontal U-shape is secured to the face of wall 12 as by suitable mounting screws 201 (Fig. 18). Due to the U-shaped construction of the block 200, the space between its ends forms in effect a recess 202, Fig. 16, which is adapted to removably receive therein an insert 203, which is retained in part by retaining screws 204 at each end of the stationary block.

The stationary block 200 has a guide rod mounted at each end, each rod having an upwardly extending end portion 205 and a downwardly extending end portion 206, which respectively support and guide an upper head member 207 and lower head member 208 which are urged away from each other by expansion coil springs 209 surrounding the end portions of the guide rods and extending between the head members and the adjacent ends of the stationary block 200. Separating movements of the head members is limited by abutment nuts 210 in threaded engagement with the outer ends of the guide rods.

It will be observed that the head members are recessed on their confronting faces so as to be of substantially U-shape as viewed in elevation and that pairs of cutting blades 58' have the upper blades suspended from a pin 211, while the lower blades of each pair are carried by a pin 212 in a manner similar to that previously described, except that in this case the blades are freely positionable along their supporting pins.

The construction of the insert 203 determines the spacing between the blade pairs, and consequently the length of the end portions of insulation which will be stripped from the cut ends of the wire. The details of construction of the insert 203 are shown in general in Fig. 21. The insert is provided with transversely extending slots 213 which open into the forward face of the insert, the slots being spaced apart to provide ribs 214. Each slot 213 is adapted to receive a pair of cutting blades, each pair of blades having a finger extension 215, Fig. 22, these fingers overlapping in each assembled pair of blades so that the blades will be mutually guided during their cutting operation movements. The slots 213 intersect with a longitudinally extending passageway 216 throughout the block length. Adjacent the ends of the insert 203, the passageway 216 has wire guiding bushings 217 permanently secured therein, each of these bushings being set back slightly from the end of the insert with which it is associated so as to permit the innermost end of a guide bushing 218 to project into the passage 216 and assist in retaining the insert 203 in proper position. Each of the guide bushings 218 is supported in an axially aligned passage in the end of the stationary block 200, each of these guide bushings being retained by a set screw 220 (Fig. 12).

The wire or other filamentary material is conducted to the cutting mechanism from the guide tube 51' of the feeding mechanism 15' through a tubular guide 221 which has its right end, as shown in Fig. 16, slidably mounted in the adjacent bushing 218, while the wire or filamentary material leaving the cutting mechanism is conducted through a tubular guide 222 which similarly has one end slidably mounted in the guide bushing 218 on the other side of the cutting mechanism.

The pairs of cutters operate in substantially the same manner as the cutters shown in Fig. 5 and previously described for severing the filamentary material, and in the case of insulated wire severing the insulation the required distance from the severed ends of the wire. In this embodiment, however, relative movement is effected in a manner to hereinafter be described between the wire core and insulation, while the material is in the cutting mechanism. In this case, the end portions of insulation are removed within the insert 203, and provision is made for disposing of these insulation portions at this location. The manner in which this is accomplished will subsequently be described in detail, but at this point it may be mentioned that the insert 203 is formed with inclined faces 223 in its end and rib portions, these inclined faces forming an inclined path over which the removed insulation portions may readily escape under the action of gravity. In order to assist the removal of the stripped insulation portions, it is proposed to provide one or more air blast ducts 224 in the ribs 214, which are adapted to introduce a blast of air on the back side of passageway 216, where it passes through the ribs.

Since the head members 207 and 208 are normally biased by the coil springs 209 to positions in which the cutter blades are in a non-cutting position, it will be appreciated that it will only be necessary to provide power means for moving the head members towards each other in order to effect a cutting operation by the pairs of cutter blades. Pneumatic power cylinders 225 and 226 have been utilized in this embodiment of the invention, these cylinders being secured to the wall 12. The cylinder 225 has a power delivery stem 227 bearing against the upper head member 207, while the power cylinder 226 has a stem 228 which bears against the lower head member 208. Upon energization, the cylinder stems are moved in a direction to force the cutter blades into a cutting position.

*The stripping mechanism*

In the pneumatic embodiment, the stripping of the insulation sections is basically the same as in the electrical embodiment. In both arrangements, the stripping is accomplished by instituting relative movement between the wire core and the severed insulation sections. In the pneumatic embodiment, however, a different mechanism is utilized, and two similarly constructed and similarly operated stripping mechanisms 17' are utilized for respectively stripping the insulation from the respective severed ends of the material. For this reason, it is believed that the construction and operation will be clearly understood from a description of one only of the stripping mechanisms. The two stripping mechanisms are mounted on opposite sides of the cutting mechanism as clearly shown in Fig. 12.

As shown primarily in Figs. 16, 17 and 18, each stripping mechanism comprises a plate member 229 of substantially rectangular configuration, this plate being supported in parallel relation to the wall 12 by spaced antifriction rollers 230 which engage its upper and lower edges and permit endwise reciprocable movements of the plate. The two plates 229 of the respective stripping mechanisms are normally biased in directions towards each other and towards the cutting mechanism by means of coiled tension springs 231 which respectively interconnect the plates at their upper and lower edge margins. Movement of the plates in an opposite direction away from each other is accomplished by an actuating stem 232 in each case, the stem being secured at one end as by a screw 233 (Fig. 18) to the plate and projecting rearwardly through an opening 234 in the wall 12. Thus, the stem 232 projects rearwardly of the wall 12 for association with power actuating means which will be described subsequently.

As best shown in Figs. 12, 16 and 17, a pair of jaw carrying members 235 and 236 are supported for parallel movements which bring integrally formed jaws 237 into and out of gripping relation with the insulation on the wire, these jaws respectively being positioned in suitable openings 238 in the tubular guide 221. Between the jaw carrying members 235 and 236, there is secured to the tube 221 oppositely extending trunnions 239 and 240 (Fig. 18). The trunnion 239 extends rearwardly and serves as a common pivot for a pair of crossed levers 241 and 252 which are pivotally connected at one set of their ends) by pivot pins 243 to the respective jaw carrying members, and at their other ends by pivot pins 244 to the outer ends of a pair of toggle links 245 and 246 having a common pivot connection at their adjacent ends on pivot pin 247 carried by a block 248 which is slidably supported on the tubular guide 221. On the opposite side of the trunnion 239 from the pivot pins 243, the crossed levers are provided with pins 249 which are positioned in elongate slots 249', respectively, in the jaw carrying members 235 and 236.

On the front side of the jaw carrying members 235 and 236, a pair of crossed members 250 and 251 are provided, these members having their ends pivotally connected with the pins 243 and 249, and pivoted intermediate their ends upon the trunnion 240 (Fig. 12). As shown in Fig. 18, the block 248 is provided with a rearwardly projecting stem portion 252 which connects with the plate 229 and is retained in spaced relation by means of a spacing sleeve 253.

A coiled spring 254 is shown as being mounted on the tubular guide 221 with one end abutting the block 248 and its other end provided with an abutment washer 255 which will engage against the adjacent ends of the jaw carrying members 235 and 236, when the jaws thereof are in wire gripping position. The spring 254 operates to prevent the pin 247 from moving past a dead center position of the toggle links 245 and 246.

As best shown in Fig. 18, the tubular guide 221, between the feeding mechanism 15' and the adjacent stripping mechanism 17' is slidably supported in a bracket block 256. Frictional resistance to the movement of the tubular guide 221 in the block 256 is obtained by providing a friction disc 257 which is pressed against the tubular guide by a coil spring 258, the pressure of which is adjustable by means of a screw plug 259. The purpose of the frictional resistance to the movement of the tubular guide will be explained in connection with the description of the operation of the stripping mechanism.

The normal position of the stripping mechanism is shown in Fig. 16, and in this position the jaws 237 are disengaged with respect to the wire material, and it is at this time possible for the wire to be fed freely to the cutting mechanism. At the proper point, the control as previously explained in connection with the electrical embodiment, operates to stop the wire feed and operate the cutter. The central pair of cutters sever the wire core, while the two outwardly positioned pair of cutters sever only the insulation. While the cutters are in closed cutting position, as just explained, the stripping mechanism is actuated in proper timed relation, by means which will be subsequently explained.

The stripping mechanism is actuated by movement of the stem 232 towards the left, as shown in Fig. 18. This movement carries the left hand stripper plate 229 to the left, and at the same time the right hand stripper mechanism is actuated by movement of its stem 232 towards the right, or in the opposite direction. As the plate 229 is moved, it also slides the block 248 on the tubular guide 221, which at this time is initially held against movement by the frictional resistance of friction disc 257. Movement of the block 248 acts through the toggle links 245 and 246 to cause a scissor action of levers 241 and 242 so as to move the jaws 237 into gripped relation with the wire material. It will be apparent that this action would not take place if the tubular guide 221 were free to move, since there would be nothing to prevent the movement of the trunnions 239 and 240 simultaneously with the block 248.

Now, as the plate 229 is further moved to a position as shown in Fig. 17, it will be observed that such action pulls the severed end 259' of the wire from the severed insulation section 259'', the insulation cutters cooperating by holding the insulation against movement, while the wire end is being pulled out of the insulation section which has been severed. At the conclusion of the stripping operation, the cutter blades are actuated to opened position, thereby releasing the insulation sections for disposal by aid of air jets from the ducts 224. Upon release of power on the stem 232, the plates 229 of the stripping mechanisms are restored to normal position, as well as the parts of the striping mechanisms, by the action of springs 231.

The stripping mechanisms are actuated by a double ended pneumatic cylinder 260, as shown in Fig. 13, this cylinder having operating stems 261 and 262 respectively associated with the stems 232 of the stripping mechanisms, and adapted to apply power when energized.

*The pneumatic power means and control therefor*

Referring to Fig. 13, it will be observed that the controls for the pneumatic power cylinders and the feeding mechanism are mounted on the rear face of wall 12. A suitable source of compressed air is brought to the apparatus through a supply conduit 263 from a suitable source, not shown. The conduit 263 connects with a conduit connector 264 which has one end connected with the supply conduit 263 and its other end connected with the inlet to a control valve 265 having a swingable operating lever 266 adapted in one position to connect the compressed air inlet with an outlet connection 267 and in another position to connect the outlet connection with an exhaust conduit 268, this latter position constituting the normal off position of the valve.

Provision is made for operating the valve electromagnetically by means of a solenoid coil 269 which is operatively associated with a plunger 270. The plunger 270 is shown as being connected at one end with the outer end of the operating lever 266 by a connecting rod 271. The other end of the plunger 270 is connected with a rod 272 which is supported for reciprocable sliding movement in spaced supporting posts 273, these posts being affixed by suitable means to the wall 12 and supported in a projecting position. The rod 272, the plunger 270, and connecting rod 271 are normally biased by an expansion spring 274 towards the left, as viewed in Fig. 13, to the off position of the valve 265. This spring surrounds an end portion of the rod 272, one end of the spring bearing against a collar 275 fixed on the rod 272 for movement therewith, while the other end of the spring bears against a slidably mounted collar 276 which is adapted to abut the adjacently positioned post 273.

The rod 272 also carries a collar 277 which is adjustably positionable along the rod, this collar having a tapered end 278 forming a cam surface having operative association with a roller 279 at the outer end of lever 100'. The lever 100' functions in a similar manner to the rocker arm 100 previously described, and similarly carries an idler pinion 42 adapted to connect and disconnect the pinion 41 of the feeding mechanism with respect to the driving gear 43 for the same purpose as heretofore described. In a similar manner, a spring 104' acts to bias the lever in a counterclockwise direction, as viewed in Fig. 13, to a position in which the idler pinion 42 is in engagement with the pinion 41 and the roller 279 is in the path of movement of the cam surface of the collar 277. This cam surface, when the solenoid coil 269 is energized, moves under the roller and acts to disengage the idler pinion 42 from pinion 41, and thus disconnect the latter from driving connection with gear 43. This operation takes place during the cutting operation so that the material to be severed will have its feeding movement terminated at such time.

The outlet connection 267 connects with branch conduits 280 and 281. The first of these connects with delivery conduits 282 and 283 which are respectively connected through a quick exhaust valve 284 with power cylinders 225 and 226. These cylinders are immediately energized, when the operating lever 266 is moved to a position in which the valve inlet is connected with the outlet connection 267.

The conduit 281 is connected with pneumatic cylinder 260 through an adjustable regulating valve 285. Thus, by properly adjusting the valve 285, energization of the pneumatic cylinder 260 may be sufficiently delayed to cause the stripping mechanisms to operate in proper timed relation with respect to the cutting operation.

It will be appreciated that it is desirable that the actuation of the valve operating lever 266 to a position for connecting the outlet connection 267 with the exhaust connection shall be suitably timed so as to deenergize the pneumatic cylinders 225 and 226 at the conclusion of the stripping operation, and that these pneumatic cylinders should be quickly exhausted. Also, means should be provided to assure that the feeding mechanism remains inoperative until the stripping operation has been concluded.

In order to permit quick exhaust of the pneumatic cylinders 225 and 226, a quick exhaust valve is provided in each case, this valve being shown in detail in Fig. 20 and generally indicated by the numeral 284. More specifically, the quick exhaust valve comprises a tubular body 286 having a threaded open end 287 and an opposite end closed except for a threaded passage 288 adapted to have a supply conduit, such as conduit 282 or 283, connected thereto.

Within the body 286, there is slidably mounted a cup-shaped piston 289 which is positioned with its closed end facing the passage 288, and its open end facing in the same direction as the threaded open end 287 of the body. Between its ends, the piston is provided with a circumferentially extending groove 290 which communicates through circumferentially spaced openings 291 with the interior of the piston. The piston is normally retained in a position wherein the closed end thereof covers the passage 288, the piston being biased to this position by an expansion spring 292, one end of this spring being seated on a gasket 293 positioned inside the piston and covering its bottom portion. The other end of the spring 292 surrounds a tubular stem 294 formed on a closure cap 295 which is adapted to threadedly engage and close the threaded open end 287 of the body. The tubular stem has its internal passage extended through the body of the cap so as to form a communication with atmosphere from the interior of the body 286. The body 286 has a threaded wall opening 296 by which a connection may be effected by a threaded nipple 297 with the pneumatic cylinder with which the exhaust valve is associated. It will be observed that the threaded opening 296 is so positioned that it will communicate with the groove 290 in the normal seated position of the piston 289.

With the quick exhaust valve construction described above, it will be seen that, when air under pressure is supplied through the passage 288, the piston 289 will be moved to the right against the pressure of spring 292 to a position wherein the gasket 293 will seat against the inner end of tubular stem 294 and thus close the interior of the body against communication with atmosphere. In this position of the piston, compressed air is free to pass from the passage 288 directly into threaded opening 296 and thence through the nipple 297 to the associated pneumatic cylinder. However, as soon as air pressure is cut off, the spring 292 acts to move the piston to a seated position with respect to passage 288. In this position, the pneumatic cylinder is free to exhaust through the groove 290, the openings 291, and thence through the interior of the piston and the tubular stem 294 directly to atmosphere.

The exhaust connection 268 is shown as being connected through a conduit 298 with a flow passage 299 in the stationary block 200, as shown in Fig. 18, the flow passage communicating with the ducts 224 of the insert 203 so as to provide a blast of air at the conclusion of the stripping operation for removal of the strip insulation sections, as previously mentioned.

As most clearly shown in Figs. 13 and 15, provision is made for latching the lever 100' in the position in which idler pinion 42 is out of engagement with pinion 41. On the rear side of lever 100', there is secured a block 300 which is provided with a passage 301 therein adapted in the disengaged position of idler pinion 42 to be axially aligned with a reciprocably mounted rod 302. The rod 302 is connected at one end to the stem 232 of the adjacently positioned stripping mechanism 17'. The rod 302 adjacent its other end is reciprocably supported in a guide post 303. Between the guide post 303 and the stem 232, the rod is fitted with an adjustable collar 304 of similar construction to the collar 277, and likewise provided with a tapered end 305 forming a cam surface adapted in this case to cooperate in the operation of normally closed contacts of a switch 95', these contacts being operable to an open position by means of an actuating member 306 fitted with a roller 307 positioned in the line of movement of the cam surface of the collar 304.

With the foregoing construction, it will be seen that, when the stem 262 of pneumatic cylinder 260 is extended upon energization of the cylinder so as to actuate the stripping mechanism, the rod 302 will be moved to the right into a position as shown in Fig. 15 wherein the end portion of the rod extends into the passage 301. The lever 100' is thus latched with the pinion 42 disengaged from pinion 41. Moreover, during this latching operation, as shown in Fig. 15, the collar 304 will be moved into an operating position with respect to the member 306 and the roller 307, so as to open the contacts of switch 95', these contacts being in the energizing circuit of solenoid coil 269 as shown in Fig. 19. Upon deenergization of the solenoid coil 269, the stripping mechanism is restored to a normal position ready for another cutting and stripping operation. In moving to the normal position, under the action of the previously mentioned springs 231, the rod 302 will have its end withdrawn from the passage 301 and thus permit spring 104' to move the lever 100' to a position in which the pinion 42 again meshes with pinion 41 and establishes a driving connection for the feeding mechanism.

Referring further to the diagrammatic showing in Fig. 19, it will appear that the control is much simplified over the electrical embodiment, and that the same control band or tape 138 having the edge notches 142 may be utilized in the pneumatic embodiment of the apparatus. In this arrangement however, it is only necessary to utilize one control switch, namely, 143' which has normally open contacts, and which is adapted to close its contacts when a notch 142 is in proper position. Both the switches 143' and switch 95' have their contacts in series in the control circuit of solenoid coil 269, and thus control the energization and deenergization of this coil, which in turn determines sequential operation of the different parts of the mechanism in the pneumatic embodiment of the present invention.

In some cases, it may become necessary to prevent slight deviations in the required lengths of cut material, which might, under some conditions of operation, result from a tendency of the control band 138 and its driving mechanism, due to their inertia, to coast slightly after the power is cut-off. This drift in length of cut may be readily eliminated by providing a solenoid brake 308 for the control band as diagrammatically illustrated in Fig. 19. The brake has an actuating coil 309 connected in parallel with the coil 269 so as to be energized and deenergized simultaneously therewith. When the coil 309 is energized, the brake grips the band 138 and quickly stops its movement.

Various modifications may suggest themselves to those skilled in the art without departing from the spirit of my invention, and, hence, I do not wish to be restricted to the specific forms shown or uses mentioned, except to the extent indicated in the appended claims.

I claim:

1. Apparatus for cutting and stripping the severed ends of an insulated wire, comprising: first cutter means and second cutter means cooperable to sever the wire and the insulation only adjacent the cut made in the wire; electro-magnetic means for independently actuating each of said cutter means including an energizing circuit; a mechanical interlock interconnecting said first and second cutter means for simultaneous operation; means for feeding said material with respect to said cutter means; switch contacts for controlling said energizing circuit; and means for actuating said contacts in timed relation to the feeding speed of said material.

2. Apparatus for cutting a filamentary material, comprising: a cutter; a rotatable feed roller for feeding said material to said cutter; power means for driving said roller including a gear supported for movement into and out of a meshed driving position; means normally biasing said gear toward a meshed driving position; electro-magnetic means spring biased in one direction to move said gear out of meshed driving position, and energizable to release said gear for movement by said biasing means into meshed driving position; switch means for energizing said electro-magnetic means upon starting the apparatus; and means energizable to operate said cutter and move said gear out of meshed driving position to terminate feeding movement during cutting operations.

3. Apparatus for cutting a filamentary material, comprising: a cutter; a rotatable roller for feeding said material to said cutter; means for driving said roller including a gear train; means for actuating said cutter and shifting the axis of rotation of one of said gears to unmesh its teeth with a companion gear of the train, whereby feeding movement of the material is terminated during the cutting operation; and auxiliary means operative to unmesh the teeth of said gear upon deenergization of the apparatus.

4. Apparatus for cutting a filamentary material, comprising: a cutter; electrically controlled power means for actuating said cutter including an energizing circuit; means for feeding said material to the cutter; an elongate band supported for endwise movement; means including an adjustable speed transmission for driving said band from the material feeding means; switches operable by said band movement for controlling said energizing circuit; and means for varying said transmission including a dial having having calibrations indicative of lengths of material to be cut.

5. Apparatus for cutting a filamentary material, comprising: a cutter; electrically controlled power means for actuating said cutter including an energizing circuit; means for feeding said material to the cutter; an elongate band supported for endwise movement and driving at a speed proportional to that of said material, said band having its opposite edge margins deformed at differently spaced intervals; switches respectively actuated by the deformations on each of said edge margins; and means for selectively connecting said switches for controlling said energizing circuit.

6. Apparatus for cutting a filamentary material, comprising: a cutter; electrically controlled power means for actuating said cutter including an energizing circuit; means for feeding said material to the cutter; an elongate band supported for endwise movement; means including an adjustable speed transmission for driving said band from the material feeding means; and switches operable by said band movement for controlling said energizing circuit.

7. Apparatus for cutting a filamentary material, comprising: a cutter; means for feeding said material to said cutter; electro-magnetic means having an energizing circuit and operable upon energization to actuate said cutter and deactivate said feeding means; normally closed contacts operable to open position in response to the actuation of said cutter; a pre-set relay having an operating coil and normally open contacts, one set of contacts being positioned in the energizing circuit of said electro-magnetic means, and another set of contacts in series with said first mentioned contacts for completing a holding circuit for its operating coil; and timing control means for cyclically actuating switches for completing the energizing circuit of said electro-magnetic means, and for energizing the operating coil of said pre-set relay.

8. Apparatus for cutting a filamentary material, comprising: a cutter; means for feeding said material to said cutter; electro-magnetic means having an energizing circuit and operable upon energization to actuate said cutter and deactivate said feeding means; normally closed contacts operable to open position in response to the actuation of said cutter; a pre-set relay having an operating coil and normally open contacts, one set of contacts being positioned in the energizing circuit of said electromagnetic means, and another set of contacts in series with said first mentioned contacts for completing a holding circuit for its operating coil; timing control means operable at spaced time intervals for momentarily closing in succession a first set of control contacts for completing the energizing circuit of said electro-magnetic means, and a second set of contacts for energizing the operating coil of said pre-set relay; and a manually operable switch for initially energizing said relay operating coil independently of said second set of contacts.

9. Apparatus for cutting an insulated filamentary material and stripping the insulation from the adjacent cut ends, comprising: cutter means operable to sever said material and adjacent end portions of said insulation; rotatable feeding means for moving said material to the cutting position; driving means for actuating said feeding means including a driving gear train; means swingably supporting one of said gears for movement to meshed and unmeshed positions in said gear train; means for normally biasing said supporting means to move said one gear to meshed position; means for actuating said cutter and moving said supporting means to move said one gear to unmeshed position, whereby feeding movement of the material is terminated during the cutting operation; and pneumatic means operable upon energization to latch said one gear in unmeshed position and relatively move the cut ends of the filamentary material with respect to the severed insulation portions thereon, whereby the insulation portions are stripped; said pneumatic means upon deenergization releasing said supporting means for biased movement of said one gear to meshed position.

10. In apparatus for cutting and stripping insulation from an insulated wire: a cutter; means for feeding said wire to the cutter; a tubular guide for said wire supported for movement against a frictional resistance; a first member supported for endwise movements in opposite directions; a pair of crossed levers having a common pivot between their ends on said guide; a pair of jaw members respectively pivoted adjacent said common pivot on said crossed levers for parallel movements by the actuation of said levers to gripped and ungripped relation with respect to said wire; a pair of toggle links having adjacent ends pivotally connected with said first member and outer ends respectively pivotally connected with said levers, so that initial relative movement of the first member and guide causes the jaws to grip the wire, and further movement shifts the jaws and first member as a unit away from said cutter to strip the severed insulation.

11. In apparatus for cutting a filamentary material: upper and lower head members supported for movements towards and away from each other; a plurality of coacting overlapping pairs of cutter blades, one blade of each pair being supported from the upper head and the other from the lower head, the blades associated with each head being freely movable to change their relative spacing; an elongate block positioned between said head members, said block having aligned passages in its ends for guiding the filamentary material between the cutter blades, and a recessed portion between its ends; a removably mounted insert in said recess having a longitudinal passage adapted to align with said end passages; and a plurality of transverse slots opening on one side of said insert, said slots intersecting said longitudinal passage, each slot being adapted to guidingly receive a pair of said cutter blades, and the spacing between said slots determining the distance between the cuts on said filamentary material.

References Cited in the file of this patent

UNITED STATES PATENTS

| | | |
|---|---|---|
| 1,167,764 | Liebig | Jan. 11, 1916 |
| 1,172,058 | Scheyer | Feb. 15, 1916 |
| 1,632,004 | Hampton | June 14, 1927 |
| 1,784,298 | Mahan | Dec. 9, 1930 |
| 1,787,658 | Andren | Jan. 6, 1931 |
| 1,831,115 | Holmes | Nov. 10, 1931 |
| 1,835,801 | Mayhew | Dec. 8, 1931 |
| 1,856,169 | Rosener | May 3, 1932 |
| 2,202,889 | Bates | June 4, 1940 |
| 2,320,659 | Sahlin | June 1, 1943 |
| 2,379,682 | Colucci | July 3, 1945 |
| 2,456,699 | Hanson | Dec. 21, 1948 |
| 2,497,112 | Andren | Feb. 14, 1950 |
| 2,548,136 | Auer | Apr. 10, 1951 |
| 2,571,338 | Calabrese | Oct. 16, 1951 |
| 2,594,708 | Amiet | Apr. 29, 1952 |
| 2,647,455 | Adams | Aug. 4, 1953 |